March 15, 1932.  C. D. MALAGUTI  1,849,942
COUNTER STIFFENER MOLDING MECHANISM
Filed March 20, 1930   3 Sheets-Sheet 1
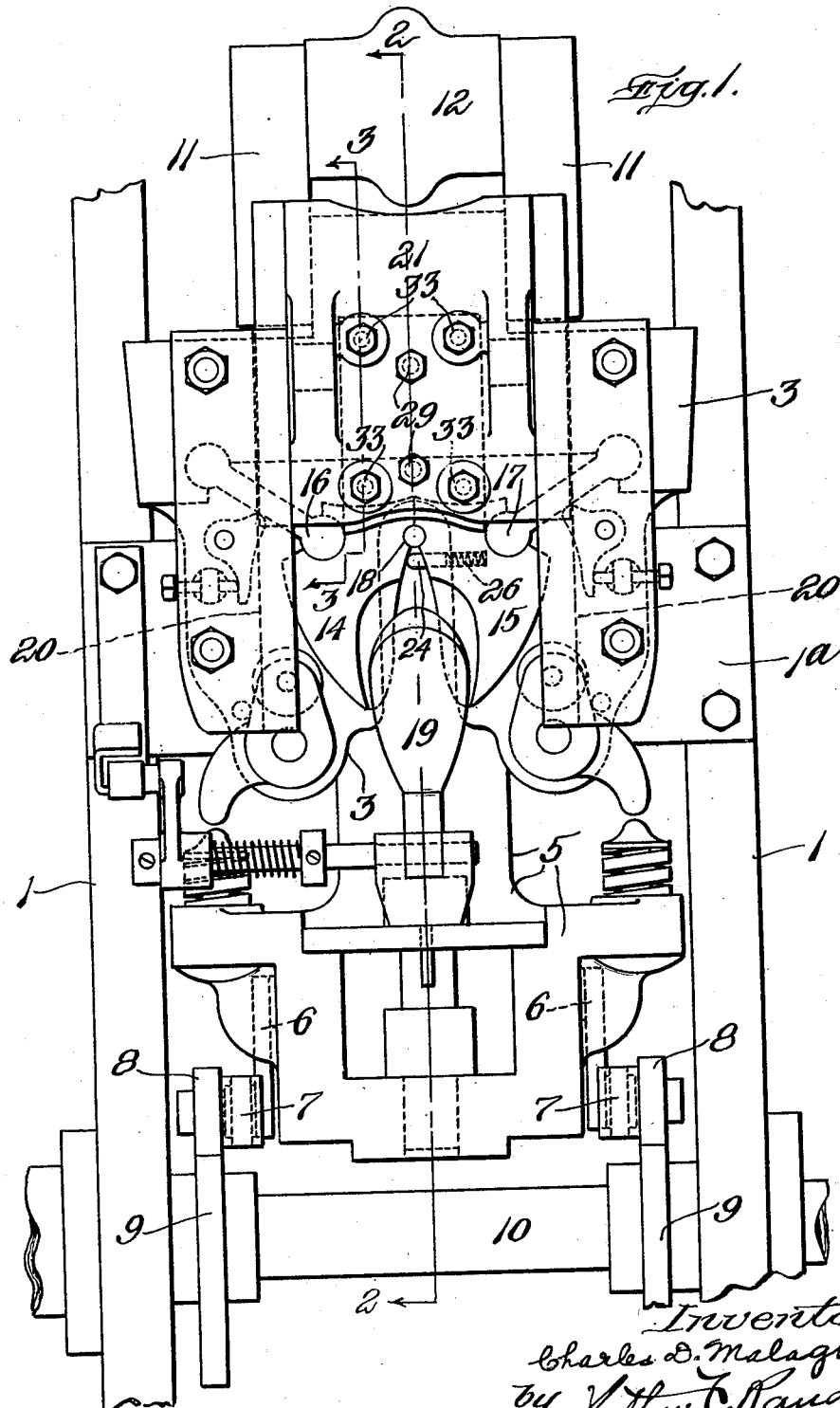

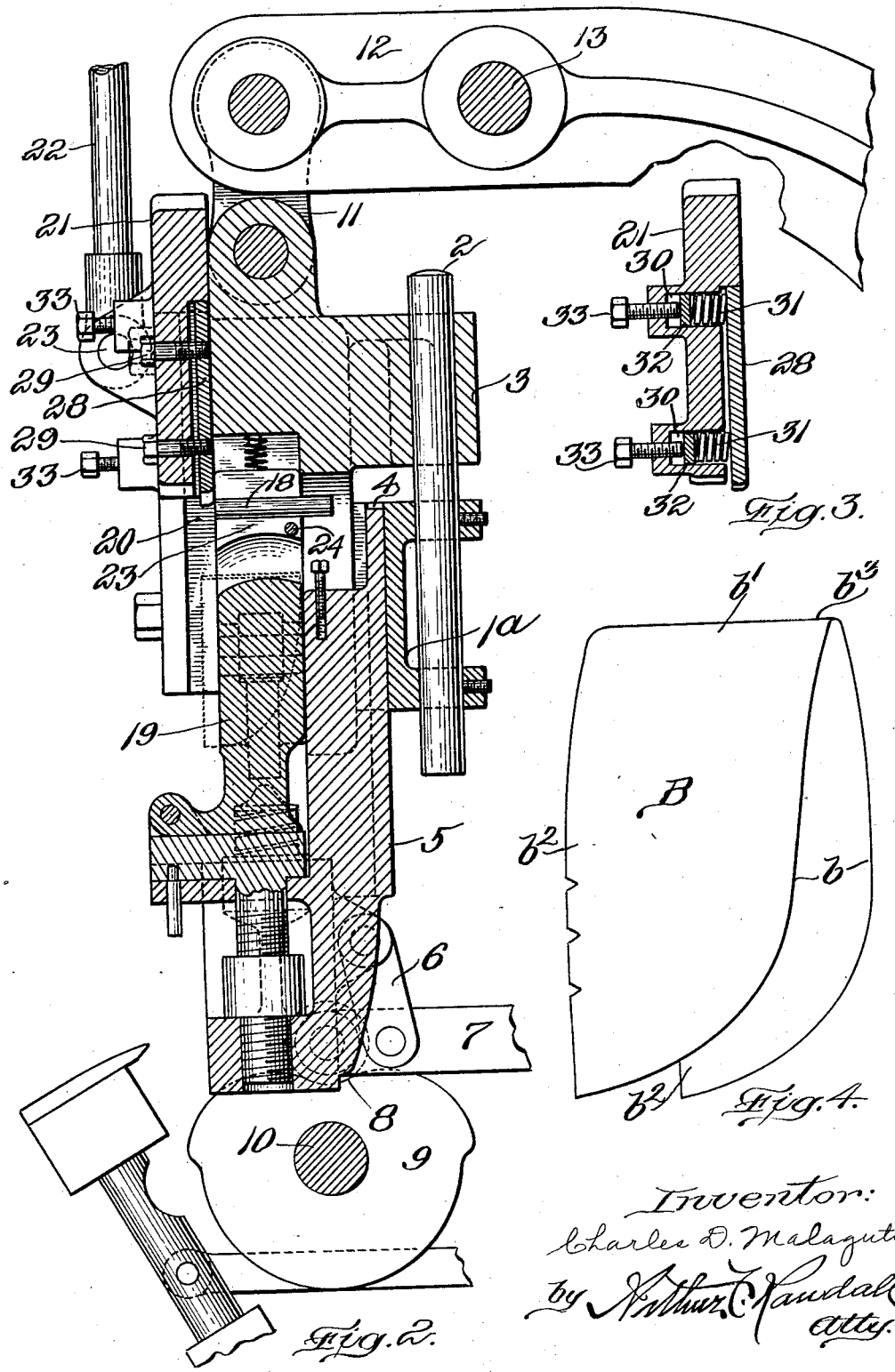

March 15, 1932. C. D. MALAGUTI 1,849,942
COUNTER STIFFENER MOLDING MECHANISM
Filed March 20, 1930 3 Sheets-Sheet 3

Inventor:
Charles D. Malaguti
by Arthur T. Randall
Atty.

Patented Mar. 15, 1932

1,849,942

UNITED STATES PATENT OFFICE

CHARLES D. MALAGUTI, OF BOSTON, MASSACHUSETTS

COUNTER-STIFFENER MOLDING MECHANISM

Application filed March 20, 1930. Serial No. 437,584.

My invention relates to machines for molding counter stiffeners for boots and shoes and it has for its object to provide an improved machine of this class.

Counter stiffener molding machines are usually constructed with a two-part female mold co-operating with a male mold member to shape the opposite side walls and back wall of the stiffener blank while the flange of the stiffener is formed by a reciprocating slide that is operated to engage the flange portion of the blank while the latter is firmly gripped between the male and female members of the molding mechanism.

Heretofore, so far as I am aware, this flange-forming slide has always been rigidly and unyieldingly supported while the machine was in operation so that it could not adjust itself to variations in the thicknesses of the stiffener blanks with the result that the flange would be properly formed on the blank by the slide only when said blank was of a thickness appropriate to the adjustment or setting of the slide. That is to say, for a given setting or adjustment of the slide, the flange of a relatively thick, or of a relatively thin, blank would be imperfectly formed or molded by the slide, and sometimes torn or disfigured. It is an object of my invention to obviate this objectionable feature characterizing most of the counter-stiffener molding mechanisms heretofore provided.

Usually the female molding member referred to has consisted of a pair of opposed recessed jaws pivotally, or otherwise, movable toward and from each other and with this type of molding mechanism each blank is bent upon itself at its middle more or less sharply as it is fed into position within the female mold member, between the latter and the male member, preparatory to being molded.

Each blank B is placed within the female mold member in this manner and when released from the hands, or other means by which it is thus fed into position, its opposite side portions spring outwardly against the walls of the recesses of the two sections or jaws of the female mold member, and by engagement therewith, hold the blank in place while the two sections of the female mold member move toward each other and toward the male mold member.

Because of the fact that the two sections of the female mold member are at the limit of their movement apart when the blank is thus placed in position within the molding mechanism, and also because of the tendency toward displacement of the blank while the two sections or jaws are moving together and toward the male member, it has heretofore frequently happened that the sharply bent middle portion of the blank, particularly the part thereof that constitutes the top of the back of the heel, would enter between the proximate inner faces of the two female mold sections, at the rear of the recesses, and be crushed or otherwise injured or disfigured. Another object of my invention is to obviate this objectionable feature which characterized most molding mechanisms as heretofore constructed.

With the above objects in view I have provided an improved mechanism for molding counter stiffeners having the peculiar features of construction and mode of operation set forth in the following description, the several novel features of the invention being particularly pointed out and defined in the claims at the close thereof.

In the accompanying drawings:

Figure 1 is a front elevation of a portion of a counter-stiffener molding machine constructed in accordance with my invention.

Figure 2 is a section on line 2—2 of Fig. 1.

Figure 3 is a section on line 3—3 of Fig. 1.

Figure 4 is a perspective view of a counter-stiffener blank showing the condition of the same as it is fed into position within the molding mechanism.

Figure 5:
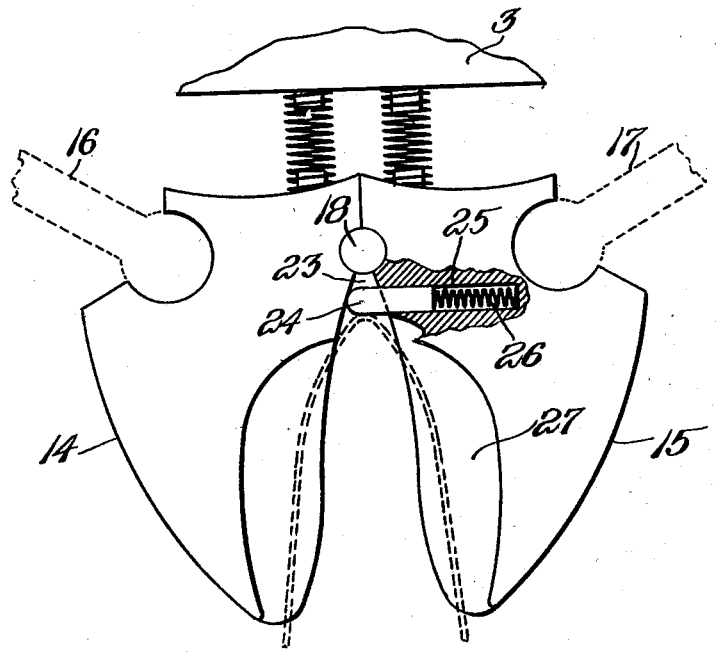
Figure 5 is a front elevation, partly broken away and in section, of the female mold member hereinafter described.

Herein I have illustrated my invention as embodied in a counter-stiffener molding machine of the type shown and described in the co-pending application of Joseph Spadafora, Serial No. 366,728, but the invention may, of course, be incorporated in machines of other types.

Having reference to the drawings, 1 represents the frame of the machine, said frame being made with a vertical post 2 on which is slidably mounted an upper slide 3 whose depending portion bears against and is supported by the front side of a cross-bar 1a, Fig. 2, forming part of the frame 1.

This front side of the cross-bar 1a is made with vertical ways 4 in which is mounted a lower slide 5 connected by links 6 with a lever 7. The free end of lever 7 is provided with a roll 8 resting upon a cam 9 fast on a continuously rotating shaft 10.

The upper slide 3 is connected by links 11 with one arm of a lever 12 fulcrumed at 13 on the frame of the machine, said lever being operated by a cam (not shown) on the main cam shaft of the machine in timed relation with the operation of lever 7.

The upper slide 3 carries the female mold member which comprises two opposed recessed jaws or sections 14 and 15 which are pivotally connected with slide 3 by means of abutment links 16 and 17, respectively. These two jaws or sections 14 and 15 are also pivotally interlocked by a pintle 18 on which they are swung toward and from each other in the usual manner during the operation of the machine.

The lower slide 5 carries the male mold member 19 which is controlled and operated as set forth in the application above referred to.

Upon the front of the upper slide 3 are provided ways 20 in which is mounted a vertically movable flange-forming slide 21 which is controlled and operated through the usual mechanism including the link 22 whose lower end is pivotally connected with said slide at 23.

When a counter-stiffener blank is placed in the molding mechanism the parts of the latter occupy the positions illustrated in the drawings, with the slides 3 and 21 at the limit of their upward movements and with the slide 5 at the limit of its downward movement. As the blank is presented to said mechanism it is bent upon itself at or near its middle as shown in Fig. 4 and then moved edgewise, top edge foremost, into the cavity of the female mold member with its legs or opposite side portions $b$ extending downwardly at opposite sides of the male mold member 19. It is then released from the means by which it was presented to the molding mechanism after which the latter operates to first forcibly compress the opposite side walls $b$ and back wall $b'$ between the male and female mold members and then while the blank is thus gripped by said two members the slide 21 is reciprocated twice to turn inwardly the marginal flange portion $b^2$ of the blank.

Heretofore trouble has been experienced because of the fact that the crevice 23 at the inner end of the cavity of the female mold member has been open to the entrance of the sharply bent portion $b^3$ at the top of the counter blank with the result that many defective counter-stiffeners were produced. My invention provides a closure for this crevice and in the preferred form thereof this closure consists of a barrier plunger 24 slidably mounted within a chamber 25 formed in the jaw or section 15 and yieldingly urged toward and against the opposite jaw 14 by a spring 26. This plunger is positioned immediately adjacent the inner end of the molding recess 27 of jaw 15 as shown in Figs. 2 and 5 and preferably opposite that side of the recess 27 (as viewed in Fig. 2) which molds the top portion of the back wall of the stiffener blank.

The reason for this is that counter-stiffener blanks are usually skived or trimmed so that each is relatively thick at its lower edge and tapers, or diminishes in thickness, toward its top edge. Consequently, when the blank is bent at its middle preparatory to placing the same within the cavity of the female mold member, the top portion of the blank bends much more sharply than the bottom portion thereof.

Owing to this fact it was heretofore possible for the sharply bent top portion of the blank to become displaced into the crevice 23 between the two jaws 14 and 15 with the objectionable result hereinbefore pointed out. My invention, however, provides simple and efficient means such as plunger 24 which prevents the blank from entering the crevice at the inner end of the cavity of the female mold member.

The slide 21 is provided upon its inner side with a hardened steel flange-engaging plate 28 that is made with two tapped holes occupied by the threaded inner ends of two stop-screws 29 provided at their outer ends with heads to engage the outer side of said slide 21. Opposite this flange-engaging plate 28 the slide 21 is also made with four symmetrically arranged chambers within each of which is provided a stiff coiled spring 31, Fig. 3, and a follower 32.

Each follower 32 is engaged by an abutment screw 33 having threaded engagement with tapped holes provided through the slide 21, while the stop screws 29 are slidably and loosely mounted within smooth holes provided through said slide 21.

The springs 31 serve to strongly but yieldingly hold the flange-forming plate at the limit of its movement toward slide 3 with the heads of stop screws 29 bearing against the outer side of slide 21. Thus when slide 21 is reciprocated to bend inwardly the marginal flange portion $b^2$ of the blank, the presser plate 28 not only fits itself to the thickness of the flange, but it is self-adjustable universally to fit itself to an uneven flange thereby subjecting all parts of the latter to uniform pressure.

What I claim is:

1. Counter-stiffener molding mechanism having, in combination, a male mold member; a female mold member co-operating therewith; a slide that is reciprocated in timed relation with the operation of said mold members and having an outer exposed side; a flange-forming plate co-operating with said mold members; means movably connecting said plate with said slide, a spring yieldingly urging said plate toward said mold members, and an adjustable abutment for said spring mounted upon said slide and accessible for adjustment from said outer exposed side.

2. Counter-stiffener molding mechanism having, in combination, a male mold member; a female mold member co-operating therewith; a slide that is reciprocated in timed relation with the operation of said mold members and having an outer exposed side; a flange-forming plate co-operating with said mold members; stop screws movably connecting said plate with said slide and serving to limit the movement of said plate toward said mold members, a plurality of springs on said slide yieldingly urging said plate toward said mold members, and an adjustable abutment screw for each spring having threaded engagement with said slide and accessible for adjustment from said outer exposed side.

3. A counter-stiffener molding mechanism having a female mold member comprising a pair of opposed recessed jaws movable toward and from each other, and means for excluding the counter-stiffener blank from the crevice between said jaws at the inner ends of the recesses thereof.

4. A counter-stiffener molding mechanism having a female mold member comprising a pair of opposed recessed jaws movable toward and from each other, and means to prevent the counter-stiffener blank from entering the crevice between said jaws at the inner ends of the recesses thereof.

5. A counter-stiffener molding mechanism having a female mold member comprising a pair of opposed recessed jaws movable toward and from each other, and a barrier immediately adjacent the inner ends of the recesses of said jaws to hold the counter-stiffener blank within said recesses.

6. A counter-stiffener molding mechanism having a female mold member comprising a pair of opposed recessed jaws movable toward and from each other, and a barrier immediately adjacent the inner ends of the recesses of said jaws for holding the blank in position between the molding surfaces of said jaws.

7. A counter-stiffener molding mechanism having a female mold member comprising a pair of opposed recessed and pivotally interlocked jaws movable toward and from each other, one of said jaws being formed with a chamber; a transversely disposed barrier plunger slidably mounted within said chamber closely adjacent the inner ends of the recesses of said jaws, and a spring within said chamber yieldingly holding said plunger against the opposite jaw.

Signed by me at Boston, Suffolk County, Massachusetts, this 20th day of January, 1930.

CHARLES D. MALAGUTI.